(12) United States Patent  (10) Patent No.: US 9,216,815 B2
Rodrigues  (45) Date of Patent: Dec. 22, 2015

(54) DEVICE FOR ACTUATING A CONTROL SURFACE OF AN AIRCRAFT

(75) Inventor: Fernand Rodrigues, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 830 days.

(21) Appl. No.: 13/376,819

(22) PCT Filed: Jun. 10, 2010

(86) PCT No.: PCT/EP2010/058179
§ 371 (c)(1),
(2), (4) Date: Dec. 7, 2011

(87) PCT Pub. No.: WO2010/142771
PCT Pub. Date: Dec. 16, 2010

(65) Prior Publication Data
US 2012/0080557 A1  Apr. 5, 2012

Related U.S. Application Data

(60) Provisional application No. 61/218,041, filed on Jun. 17, 2009.

(30) Foreign Application Priority Data

Jun. 10, 2009 (FR) .................................. 09 53850

(51) Int. Cl.
*B64C 13/30* (2006.01)
*B64C 13/28* (2006.01)

(52) U.S. Cl.
CPC ................. *B64C 13/30* (2013.01); *B64C 13/28* (2013.01); *Y02T 50/44* (2013.01)

(58) Field of Classification Search
CPC ............ B64C 9/02; B64C 13/28; B64C 13/32
USPC ................................................ 244/215, 99.3
See application file for complete search history.

(56) References Cited

U.S. PATENT DOCUMENTS 2,144,447 A * 1/1939 Barnhart ..................... 74/89.23
3,154,954 A  11/1964 Geyer
(Continued)

FOREIGN PATENT DOCUMENTS

EP  0 873 937  10/1998
EP  1 380 500  1/2004
(Continued)

*Primary Examiner* — Brian M O'Hara
(74) *Attorney, Agent, or Firm* — Blakely Sokoloff Taylor & Zafman LLP

(57) ABSTRACT

The invention relates to a device (4) for actuating a control surface (2) of an aircraft, comprising: —a frame intended to be mounted fixed in relation to a structure of an aircraft, —a bell crank part (7) mobile in rotation in relation to the frame around an axis of rotation (X, X') and adapted in order to be connected to a mechanical unit (1) for displacement of the control surface (2), —a slider (6) intended to be connected to a drive member (5), the slider (6) being mobile in translation in relation to the frame according to a direction of translation, parallel to the axis of rotation (X, X') of the bell crank part (7), —first connecting means (61) between the slider (6) and the bell crank part (7) in order to convert a displacement in translation of the slider (6) generated by the drive member (5) into a displacement in rotation of the bell crank part (7), in order to actuate the mechanical unit (1) for displacement of the control surface (2), an input part (53, 16) able to be driven in rotation by the motor, —a control rod mounted fixed in relation to the frame and extending parallel to the axis of rotation (X) of the input part and at a distance from the latter, in order to block in rotation the slider in relation to the frame and authorize a translation of the slider in relation to the frame, the control rod extends through the slider (6). Application specific to the actuating of control surfaces incorporated into a thin airfoil.

14 Claims, 9 Drawing Sheets

(56) References Cited

U.S. PATENT DOCUMENTS

Figure 1A:
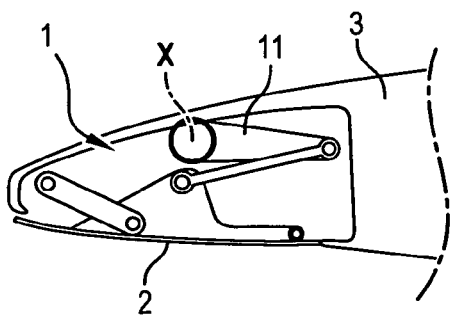

| | | | | |
|---|---|---|---|---|
| 3,731,546 | A * | 5/1973 | MacDonald | 74/63 |
| 4,575,025 | A | 3/1986 | Sadvary et al. | |
| 4,738,415 | A * | 4/1988 | Weyer | 244/99.5 |
| 6,253,632 | B1 | 7/2001 | Poulek | |
| 7,293,744 | B2 * | 11/2007 | Perez-Sanchez et al. | 244/211 |
| 7,464,896 | B2 * | 12/2008 | Carl et al. | 244/99.2 |
| 2005/0040294 | A1 | 2/2005 | Perez-Sanchez et al. | |

FOREIGN PATENT DOCUMENTS

| | | |
|---|---|---|
| FR | 2 770 826 | 5/1999 |
| FR | 2 924 538 | 6/2009 |
| GB | 577496 | 5/1946 |

* cited by examiner

# DEVICE FOR ACTUATING A CONTROL SURFACE OF AN AIRCRAFT

This is a non-provisional application claiming the benefit of U.S. Provisional Application No. 61/218,041, filed Jun. 17, 2009, and International Application Number PCT/EP2010/058179, filed Jun. 10, 2010.

FIELD OF THE INVENTION

The invention relates to a device for actuating the control surface of an aircraft, in particular a control surface of an aircraft wing.

PRIOR ART

The flight control surfaces are members making it possible to modify the flow of the surrounding air on the surface of the aircraft. The primary flight control surfaces are actuated in flight phase. The auxiliary flight control surfaces are actuated only during certain reduced speed phases, in particular the take-off and landing phases.

Among the auxiliary flight control surfaces, the control surfaces incorporated into the airfoil include leading edge slats, leading-edge flaps and trailing-edge flaps. The slats and flaps are mobile portions of the airfoil which make it possible to modify the profile of the wings during take-off and landing phases. When they are deployed, the flaps and the leading edge slats increase the curvature of the profile of the airfoil, which has for effect to increase the lift and drag forces that are exerted on the airfoil.

A flight control system allows the pilot of the aircraft to control the various control surfaces. Each control surface is generally deployed and retracted by the intermediary of an associated mechanical unit for displacing, which when the control surface is retracted comes to be lodged inside the airfoil.

Certain flight control systems referred to as "centralized" include a central drive member (motor) and a mechanical chain transmission including a control gear extending along the airfoil and reducing mechanisms, each reducing mechanism being connected to a mechanical unit for displacing a control surface.

Other flight control systems referred to as "decentralized" include a plurality of drive members, each drive member being connected to the mechanism for displacing a control surface. These systems can include in particular hydraulic cylinders in order to actuate the various mechanisms for displacing.

A disadvantage of known systems is that they include actuating devices (control gear, reducers, cylinders) that relatively occupy a lot of space. On certain aircraft, these actuating devices are moreover housed in fairings arranged under the airfoil.

But manufacturers now tend to reduce the thickness of the airfoil—i.e. provide a wing profile that is thinner and thinner—in order to reduce the weight of the aircraft, which leaves less and less space to house the devices for actuating control surfaces.

Furthermore, the actuating devices must not interfere with the structural portion of the airfoil generally comprised of a front spar, of a rear spar and of a wing box located between the front and rear spars.

Document U.S. Pat. No. 3,154,954 discloses a mechanical actuator system comprising a screw shaft, a nut having a skirt attached thereto, a reaction member and an output member connected to movable control surfaces on aircraft. The screw shaft is formed with a helical semicircular groove for receiving a plurality of balls which threadedly interconnect the screw shaft with the nut. The skirt has a first set of external helical spline teeth mating with internal helical spline teeth of the reaction member and a second set of external helical spline teeth mating with internal helical spline teeth of the output member. When the screw shaft is rotated, the skirt moves axially with the nut. Axial movement of the skirt is accompanied by angular movement, which angular movement will be imparted to the output member.

In such a system, the axial effort generated by the screw shaft is supported by the aircraft structure through two ball bearing arranged at both ends of the screw shaft.

Document U.S. Pat. No. 3,731,546 discloses a power operable pivot joint for trailing edge flaps utilizing oppositely disposed actuators. The joint comprises an input shaft having oppositely threaded portions, two sliders which may be moved in opposite directions on the shaft, and two output members which are secured to a wing flap. When the shaft is rotated, the sliders are moved axially in opposite directions thereby causing pivotal movement of the output members.

In such a system, each slider has helical grooves receiving helical key members secured to the output member and straight grooves receiving straight key members secured to a stationary structure of the aircraft. Due to the arrangement of helical and straight grooves on the same external surface of the slider, the angular stroke is necessarily limited.

SUMMARY OF THE INVENTION

A purpose of the invention is to propose a device for actuating the control surface of an aircraft adapted to be housed in a thin wing.

Another purpose of the invention is to propose an actuating device making it possible to actuate the control surface with a substantial angle of travel (typically up to 140 degrees).

This purpose is achieved within the framework of this invention thanks to a device for actuating the control surface of an aircraft, comprising:

a frame intended to be mounted fixed in relation to a structure of an aircraft, a connecting rod mobile in rotation in relation to the frame around an axis of rotation and adapted to be connected to a mechanical unit for displacing the control surface, a slider intended to be connected to a drive member, the slider being mobile in translation in relation to the frame according to a direction of translation, parallel to the axis of rotation of the connecting rod, first connecting means between the slider and the connecting rod in order to convert a displacement in translation of the slider generated by the drive member into a displacement in rotation of the connecting rod, in order to actuate the mechanical unit for displacing the control surface.

With such an actuating device, the drive shaft can be arranged in parallel to the front or rear spar of the wing.

The actuating device proposed takes advantage of the existence of an extended space available between two mechanical units for displacing a control surface. This extended space authorizes a displacement in translation Of the drive shaft parallel to the axis of rotation of the connecting rod which is fixed in relation to the wing.

The device is particularly adapted to be installed in an airfoil of low thickness, without interfering with the structural portion of the airfoil.

The device can furthermore have the following characteristics:

the first connecting means include first helical grooves arranged on a first portion of the slider and cooperating with additional helical grooves of the connecting rod, the device comprises a drive member in the form of a rotating motor and second connecting means in order to convert a rotating movement of the motor into a displacement in translation of the slider, the device comprises an input part able to be driven in rotation by the motor, and wherein the second connecting means include second helical grooves arranged on a second portion of the slider and cooperating with additional helical grooves of the input part, the rotation of the input part causing a translation of the slider, the device comprises a control rod mounted fixed in relation to the frame and extending parallel to the axis of rotation (X) of the input part and at a distance from the latter, in order to block in rotation the slider in relation to the frame and authorize a translation of the slider in relation to the frame, the control rod extends through the slider, the slider comprises a third portion having straight grooves in order to block in rotation the slider in relation to the frame and authorize a translation of the slider in relation to the frame, the first helical grooves have a resulting pitch that is higher than a resulting pitch of the second helical grooves, the device comprises:

two sliders, the sliders being mounted mobile in translation in relation to the frame according to a common direction of translation, first connecting means between the input part and each slider in order to convert a displacement in rotation of the input part into a displacement in translation of each slider, second connecting means between each slider and the connecting rod in order to convert the displacements in translation of the sliders into a displacement in rotation of the connecting rod, in order to actuate the mechanical unit for displacing the control surface, wherein the first and second connecting means are arranged in such a way that axial efforts exerted by the sliders on the input part are compensated between themselves, the common direction of translation of the sliders is parallel to the axis of rotation of the connecting rod, the first connecting means are arranged in such a way that the sliders are displaced in translation in opposite directions, the device comprises:

two drive members, and differential means in order to convert the displacements in rotation of the drive members into a displacement in rotation of the intermediary input part at a rotating speed proportional to a sum of rotating speeds of the drive members, the device comprises a drive rod comprising a first end mounted rotating in relation to the connecting rod and a second end mounted rotating in relation to an input part of the mechanical unit for displacing the control surface, the input part being mounted rotating around a fixed axis in relation to a wing of a plane.

the slider comprises a cylindrical body comprising helical grooves for ball circulation formed on an external cylindrical surface of the body and internal channels for recirculating balls formed inside the body making it possible to carry balls removed at the output of the circulation grooves in order to introduce them at the input of the circulation grooves, the slider further comprises a first end piece comprising portions of channels arranged in order to remove balls at the output of the circulation grooves and introduce the balls removed at the input of channels for recirculation, and a second end piece comprising portions of channels arranged in order to remove balls at the output of the channels of recirculation and introduce the balls removed at the input of circulation grooves, the slider comprises a cylindrical body comprising helical grooves for ball circulation formed on an external cylindrical surface of the body, and helical grooves for recirculating balls formed on the external cylindrical surface of the body and arranged between the circulation grooves, the slider comprises a cover for closing helical grooves for recirculating balls in order to form channels for recirculating balls.

PRESENTATION OF THE DRAWINGS

Figure 1B:
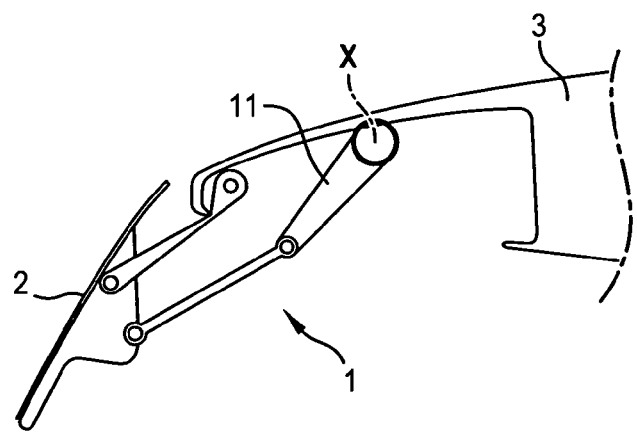
Figure 1C:
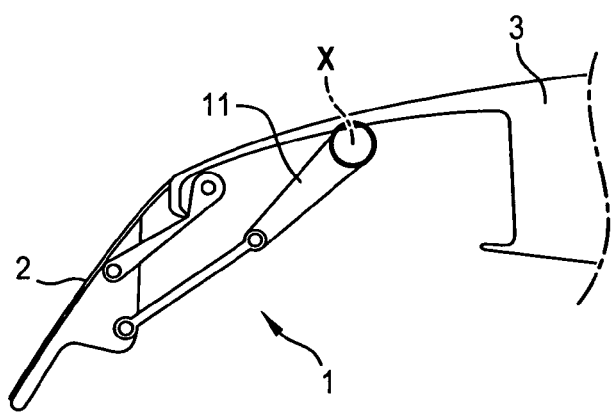
Figure 2A:
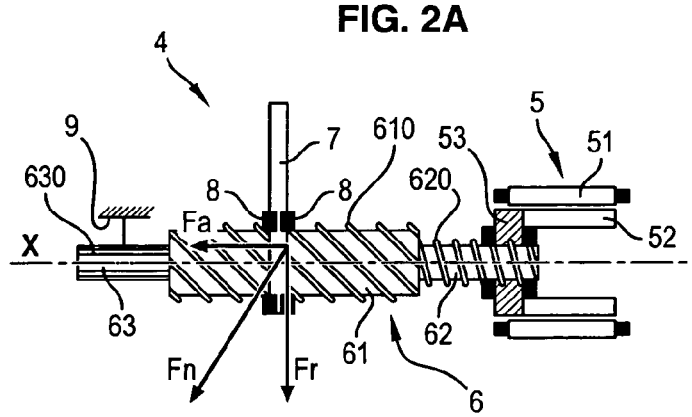
Figure 2B:
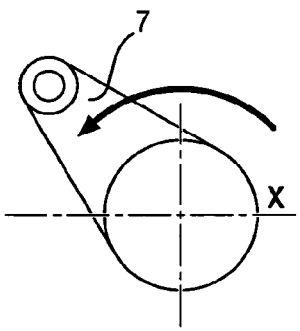
Figure 3A:
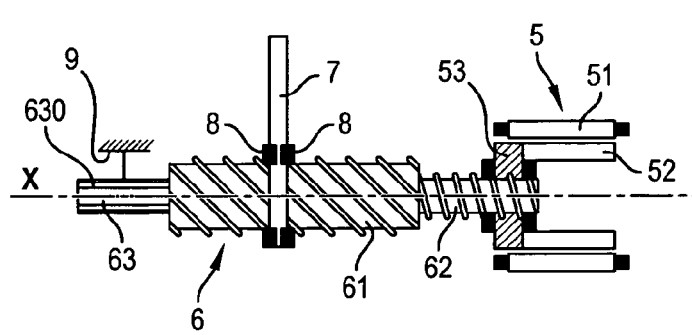
Figure 3B:
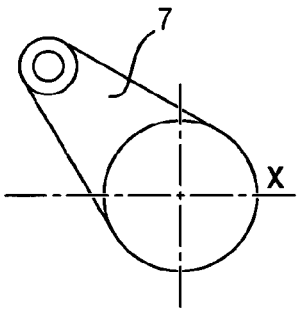
Figure 4A:
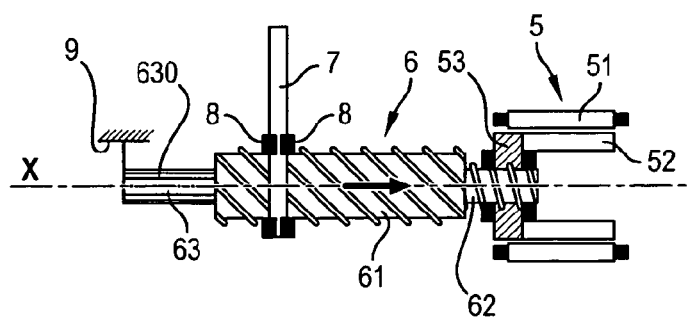
Figure 4B:
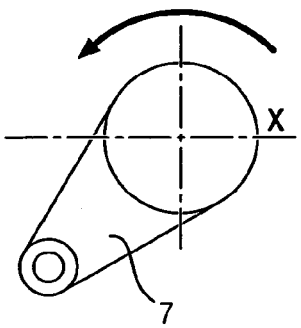
Figure 5A:
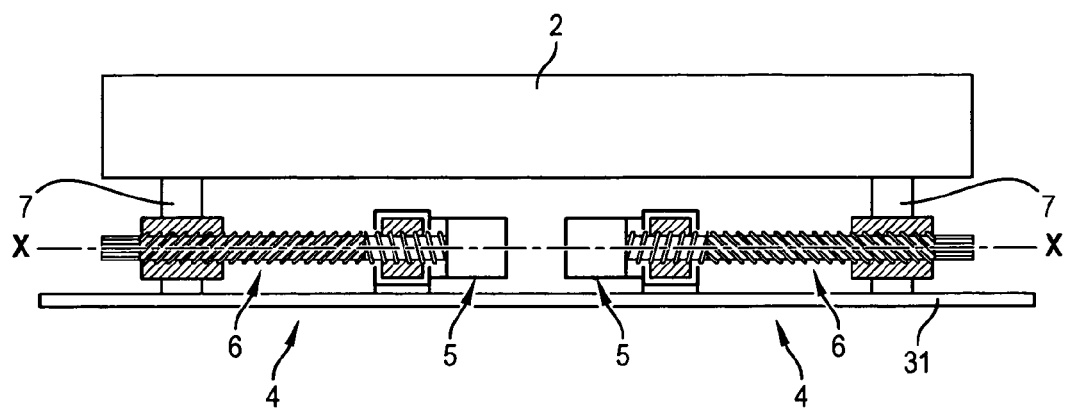
Figure 5B:
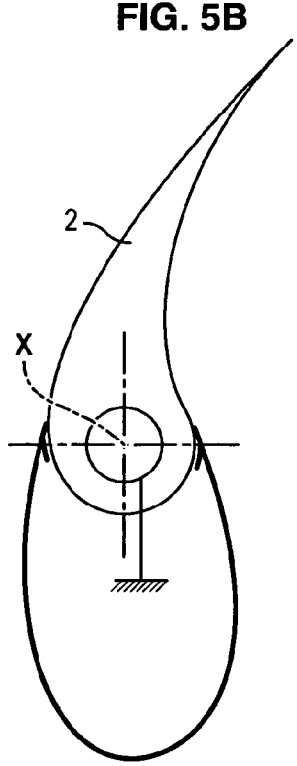
Figure 6A:
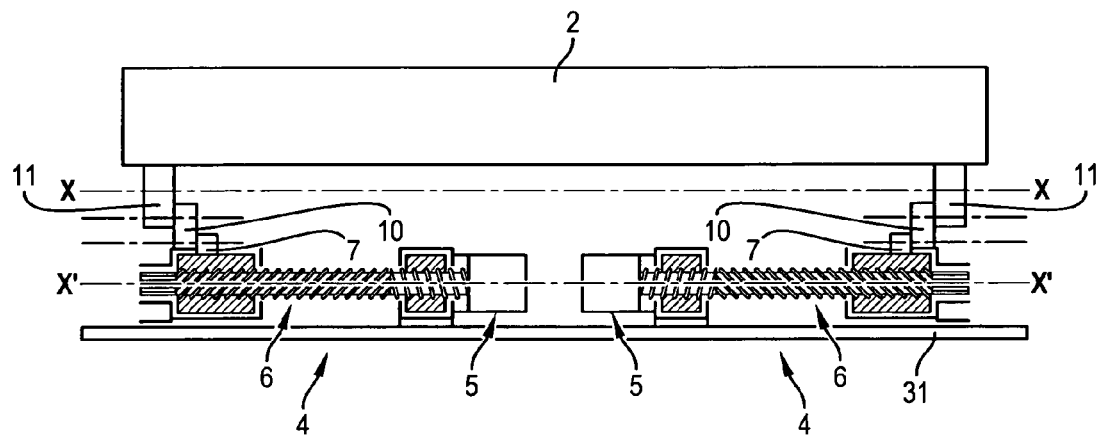
Figure 6B:
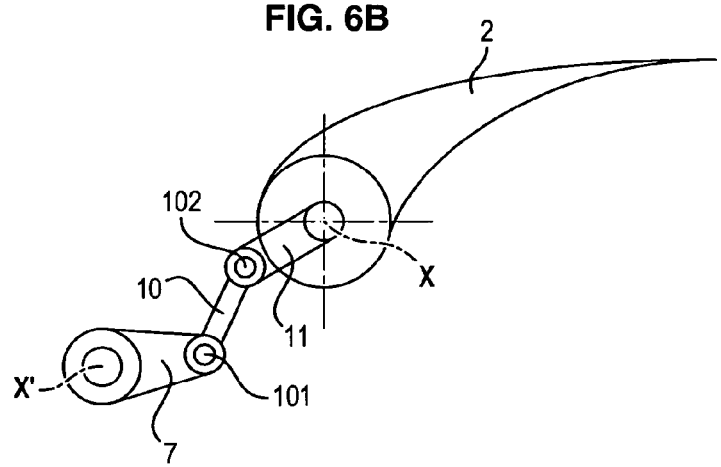
Figure 7:
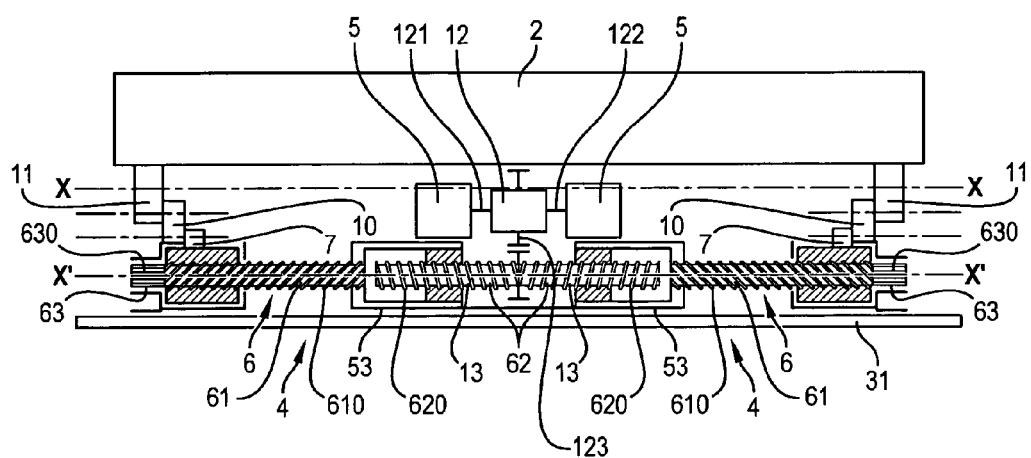
Figure 8:
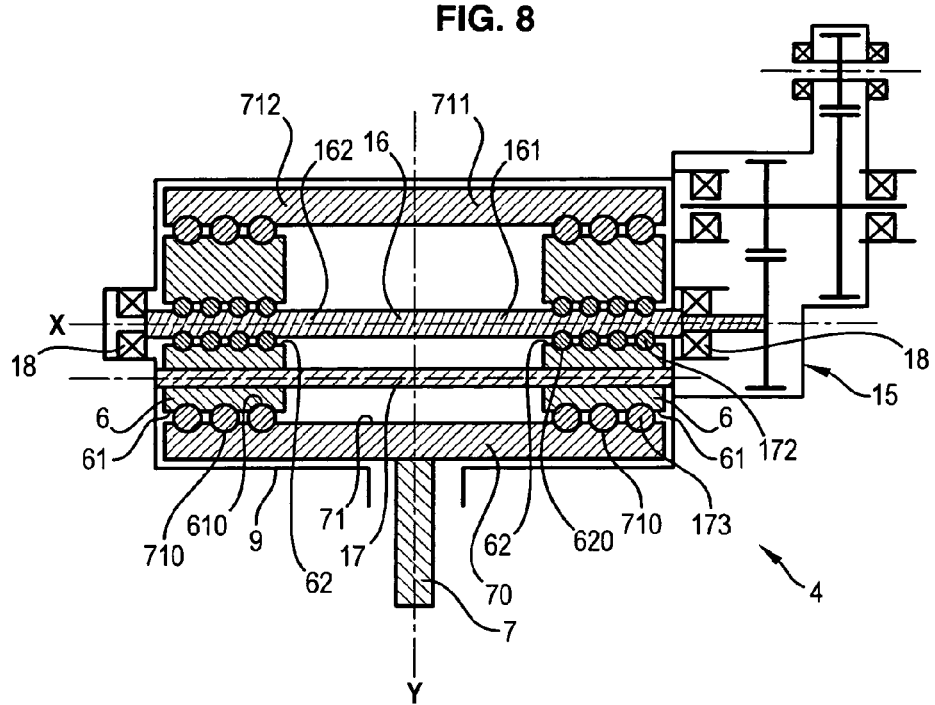
Figure 9:
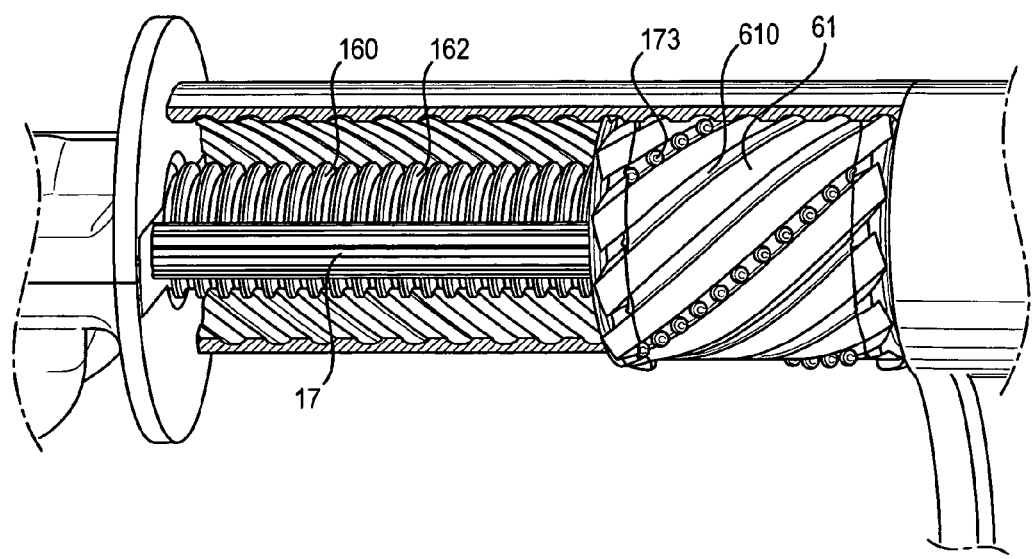
Figure 10:
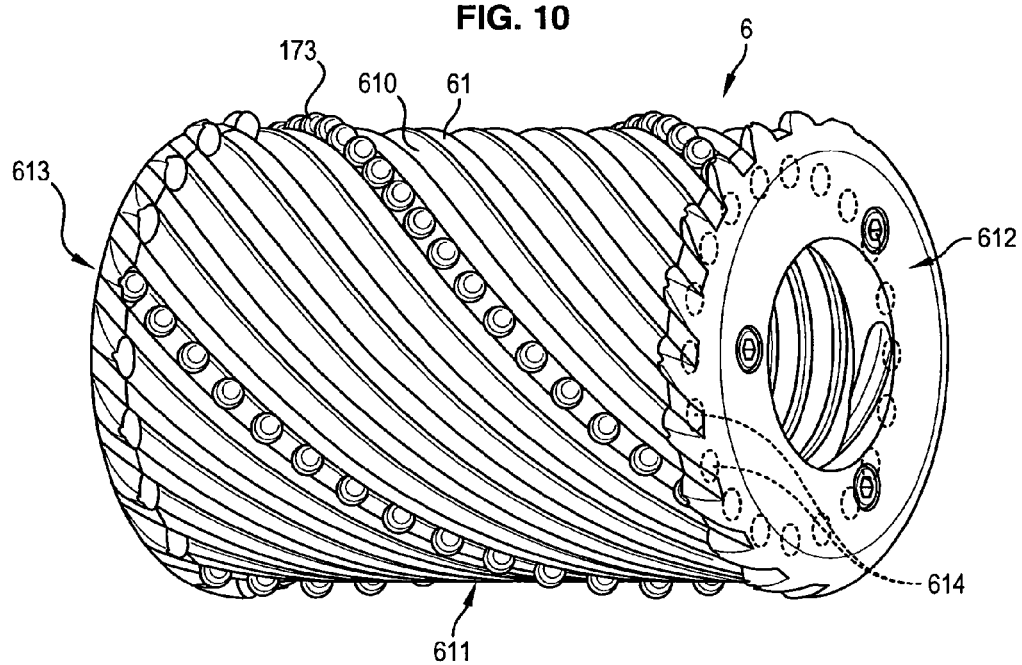
Figure 11:
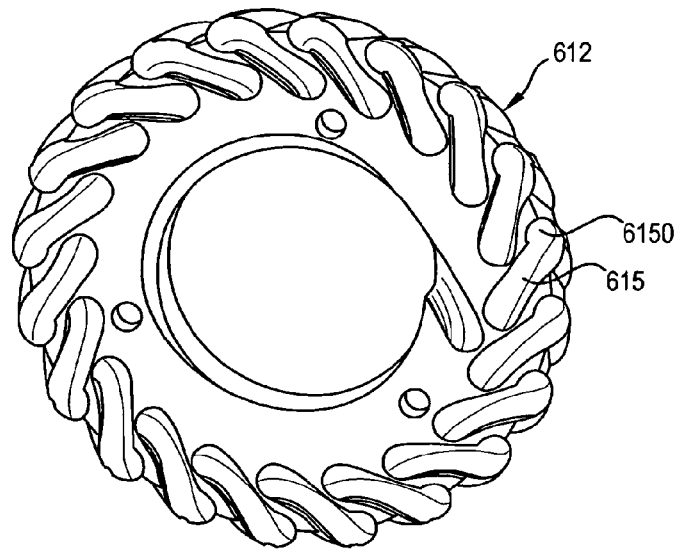
Figure 12:
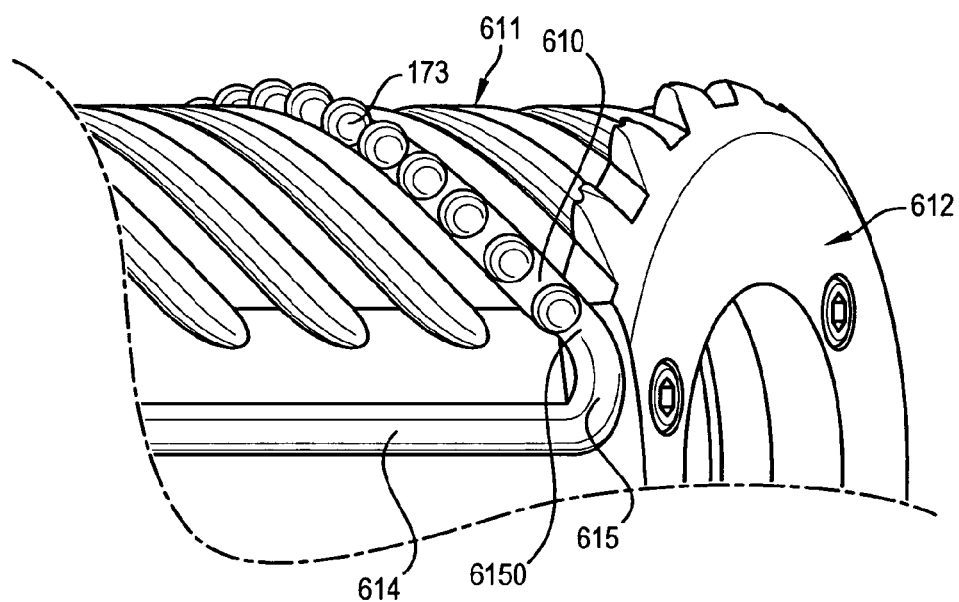
Figure 13:
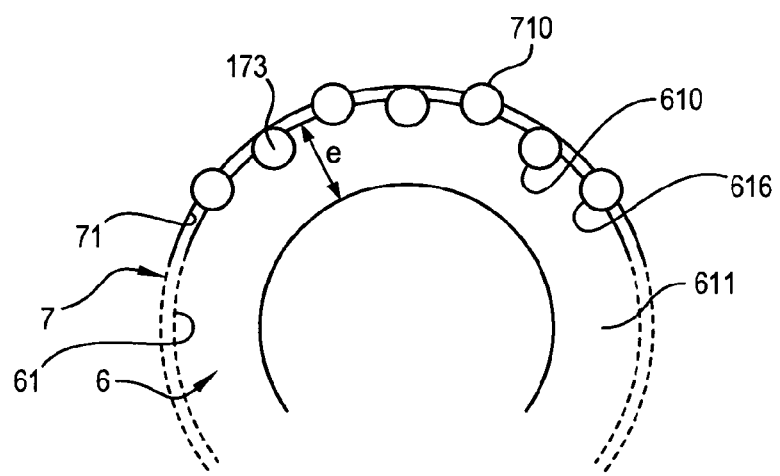
Figure 14:
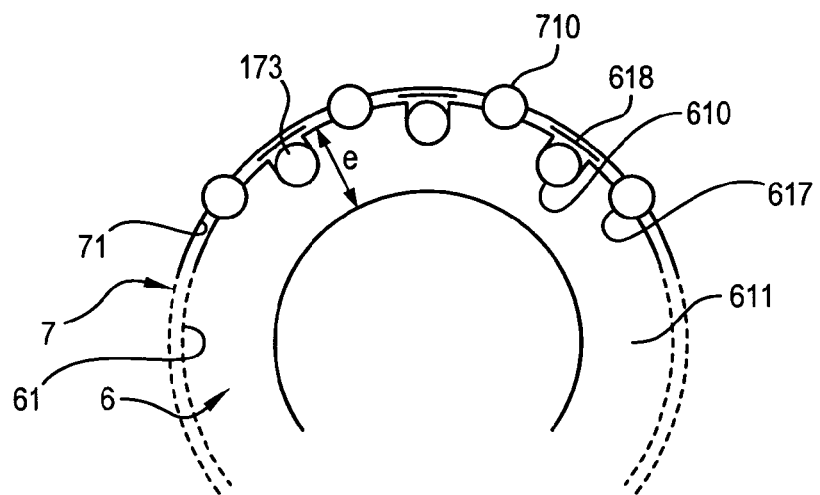

Other characteristics and advantages shall be revealed in the following description, which is purely for the purposes of illustration and is not restricted and must be read with regards to the annexed figures, wherein:

FIGS. 1A to 1C diagrammatically show, as a transversal view in relation to a wing of a plane, an example of a mechanical unit for the displacement of a leading edge flap, FIGS. 2A and 2B diagrammatically show an actuating device in accordance with a first possible embodiment of the invention, FIGS. 3A, 3B, 4A and 4B diagrammatically show two extreme positions of the actuating device, FIGS. 5A and 5B diagrammatically show a first arrangement of actuating devices in a wing, FIGS. 6A and 6B diagrammatically show a second arrangement of actuating devices in a wing, FIG. 7 diagrammatically shows a third arrangement of actuating devices in a wing, FIGS. 8 and 9 diagrammatically show an actuating device in accordance with a second possible embodiment of the invention, FIGS. 10 to 12 diagrammatically show a slider able to be used in the device in FIGS. 8 and 9, FIG. 13 diagrammatically shows another slider able to be used in the device in FIGS. 8 and 9, FIG. 14 diagrammatically shows another slider able to be used in the device in FIGS. 8 and 9.

DETAILED DESCRIPTION OF AN EMBODIMENT

FIGS. 1A to 1C diagrammatically show, as a transversal view in relation to a wing of a plane, an example of mechanical unit 1 for displacing a leading edge flap 2. The mechanical unit is deployed and is retracted in a plane substantially transversal in relation to the wing. The mechanical unit 1 comprises an input part 11 mounted rotating in relation to an axis of rotation X fixed in relation to the wing 3, the axis of rotation X extending according to a direction that is substantially parallel to the leading edge of the wing. The actuating of the input part 11 makes it possible to drive the deployment and the retraction of the flap 2 by the intermediary of the mechanical unit 1. During its deployment, the flap pivots towards the front of the wing and downwards.

In FIG. 1A, the leading edge flap 2 is in flight position. The mechanical unit 1 is retracted inside the profile of the wing. In this position, the leading edge flap 2 forms a portion of the lower surface of the wing (lower camber).

In FIG. 1B, the flap 2 is in landing position. The input part 11 is pivoted at a first angle of deflection in relation to its initial position, in such a way that the mechanical unit is deployed. The deflecting of the flap creates a slot which allows the air to pass from the lower surface of the wing (lower camber) towards the upper surface of the wing (upper camber).

In FIG. 1C, the flap 2 is in take-off position. The input part 11 is pivoted at a second angle of deflection in relation to its initial position, in such a way that the mechanical unit is also deployed. In this position, the leading edge flap 2 forms a portion of the upper surface of the wing (upper camber).

FIGS. 2A and 2B are front and side views of an actuating device 4 in accordance with a first possible embodiment of the invention.

The device 4 comprises in general a drive member 5, a slider 6 and an input part. The input part which is identified as reference No. 11 in FIGS. 1A-1C, is implemented as a connecting rod 7 as shown in FIGS. 2A and 2B.

In the embodiment of the device shown in FIGS. 2A and 2B, the connecting rod 7 is also an input part of a mechanical unit for displacing a control surface (part 11 in the FIGS. 1A to 1C). The connecting rod 7 is mounted rotating in relation to a frame 9 intended to be mounted fixed in relation to the wing of the plane around a fixed axis X by the intermediary of rotary ball abutments 8.

The drive member 5 comprises an electric motor including a fixed stator 51 in relation to the wing of the plane and a hollow rotor 52 mounted mobile in rotation in relation to the stator, and a nut 53 mounted secure to the rotor 52. The hollow form of the rotor 52 authorizes a translation of the slider 6 through the rotor 52.

In this first embodiment, the slider 6 is a drive shaft having a generally cylindrical form of revolution and extending according to a longitudinal direction confounded with the axis X of rotation of the connecting rod 7. The drive shaft 6 is formed of a single part comprising a first shaft portion 61, a second shaft portion 62 and a third shaft portion 63, arranged successively along the shaft 6.

The first shaft portion 61 is a portion comprising a surface of general cylindrical faint of revolution and having first helical grooves 610. The first helical grooves 610 cooperate with additional helical grooves of the connecting rod 7.

The first shaft portion 61 can be a ball screw portion.

The first helical grooves 610 have a substantial resulting pitch—typically between 40 and 90 millimeters according to the dimensioning of the device—in relation to the resulting pitches of usual ball screws—of a magnitude of a few millimeters to several tens of millimeters.

The second shaft portion 62 is a portion comprising a surface of general cylindrical form of revolution and having second helical grooves 620. The second helical grooves 620 cooperate with additional helical grooves of the nut 53.

The second shaft portion 62 can be a ball screw, a screw with satellite rollers (or recycling rollers) or a screw with trapezoidal profile (ACME profile).

The second helical grooves 620 have a resulting pitch between a few millimeters and several tens of millimeters.

The third shaft portion 63 is a portion comprising a surface of general cylindrical form of revolution and having third straight grooves 630, extending according to the longitudinal direction of the shaft (i.e. the direction X). The third straight grooves 630 cooperate with additional means of the frame 9 in order to authorize a displacement of the drive shaft 6 in translation according to the direction of the axis X and prevent any displacement in rotation of the drive shaft 6.

In operation, the electric motor is supplied in such a way that the rotor 52 drives in rotation the nut 53 around the axis X. The rotation of the nut 53 generates a translation of the shaft 6 according to the direction of the axis X.

Indeed, on the one hand, the drive shaft 6 is blocked in rotation by the third straight grooves 630. The third straight grooves 630 authorize only a displacement of the drive shaft 6 in translation according to the direction of the axis X, in relation to the wing. On the other hand, the second grooves 620 which cooperate with the grooves of the nut 53 convert a displacement in rotation of the nut 53 generated by the motor into a displacement in translation of the drive shaft 6.

Furthermore, the translation of the shaft 6 generates a rotation of the connecting rod 7 around the axis of rotation X.

Indeed, on the one hand, the connecting rod 7 is blocked in translation by the rotary abutments 8. The rotary abutments 8 authorize only a displacement of the connecting rod 7 in rotation around the axis X. On the other hand, the first grooves 610 which cooperate with the grooves of the connecting rod 7 convert a displacement in translation of the shaft 6 generated by the motor into a displacement in rotation of the connecting rod 7.

The device as such makes it possible to pivot the connecting rod 7 around the axis of rotation X between a retracted position (shown in FIGS. 3A and 3B), wherein the control surface is retracted, and a deployed position (shown in FIGS. 4A and 4B), wherein the control surface is deployed.

The torque C exerted by the connecting rod 7 (therefore indirectly by the control surface) on the drive shaft 6 generates on the grooves 610 a normal effort Fn which can be broken down into a radial effort Fr and an axial effort Fa, according to the radius r of the first grooves 610 and of their angle of inclination .beta. Due to the fact that the first helical grooves 610 have a substantial angle of inclination .beta., these grooves have a relatively substantial resulting pitch (between 40 and 90 millimeters), which limits the intensity of the axial effort Fa exerted on the drive shaft 6. This results in generating a low torque on the electric motor.

In addition, as the first helical grooves 610 have a resulting pitch that is higher than the resulting pitch of the second helical grooves 620, the unit formed by the nut 53, the shaft 6 and the connecting rod 7 acts as a reducer. This unit reduces the torque required exerted by the motor on the nut 53 in relation to the torque exerted by the control surface on the connecting rod 7.

These characteristics lead to using an electric motor that does not occupy much space.

In an alternative embodiment, it can be provided that the stator 51 of the motor be connected to the nut 53, the nut 53 being fixed in relation to the drive shaft 6.

FIGS. 5A and 5B diagrammatically show a first arrangement of actuating devices in order to displace a control surface 2 in a wing. The control surface 2 is connected to the wing by the intermediary of two parallel mechanical displacement units.

This first arrangement comprises two devices for actuating 4, each actuating device 4 being able to displace a respective connecting rod 7, each connecting rod 7 being an input part of one of the mechanical displacement units.

The arrangement shown in FIGS. 5A and 5B is an arrangement with torque addition. In other words, the torques supplied by the actuating devices 4 in order to displace the control surface are added together.

As is shown in FIGS. 5A and 5B, the two devices for actuating 4 are housed between the two mechanical displacement units of the control surface 2. The two devices for actuating 4 are arranged symmetrically. The extended space available between the edge of the wing and the spar 31 authorizes a displacement in translation of the drives shafts 6.

FIGS. 6A and 6B diagrammatically show a second arrangement of actuating devices in a wing. The arrangement shown in FIGS. 6A and 6B is also an arrangement with torque addition.

In the arrangement shown in FIGS. 6A and 6B, the connecting rod 7 is separate from the input part 11 of the mechanical unit for displacing the control surface.

The connecting rod 7 is mounted rotating in relation to the wing of the plane around an axis X' that is separate from the axis X of rotation of the input part 11. The axes X and X' are fixed in relation to the wing of the plane and parallel in relation to one another.

In this arrangement, the device 4 comprises a drive rod 10 having two ends 101 and 102, each end being connected respectively to the connecting rod 7 and to the input part 11 by the intermediary of pivot joints. The drive rod 10 makes it possible to transmit the rotating movement of the connecting rod 7 to the input part 11 of the mechanical unit 1 for displacement of the control surface 2.

The arrangement shown in FIGS. 6A and 6B is particularly adapted to the configurations wherein it is not possible to align the axis X' of the device 4 with the axis of rotation X of the input part 11. This is the case for example, when the axis X is very close to a surface of the wing and the space occupied by the device 4 does not make it possible to position the device 4 in alignment with the axis X.

FIG. 7 diagrammatically shows a third arrangement for actuating devices in a wing.

The arrangement shown in FIG. 7 is an arrangement with a summing of speeds. This arrangement comprises two drive members 5 and a differential 12.

Each device 4 comprises a first drive shaft 6 mobile in translation and a second drive shaft 13 mobile in rotation. In the arrangement shown in FIG. 8, the second drive shaft 13 is common to the two devices 4.

The differential 12 comprises two input shafts 121, 122 and an output shaft 123. The differential 12 is mounted in such a way that the rotating speed of the output shaft 123 is equal to the sum of the speeds of the input shafts 121 and 122.

Each drive member 5 is connected to a respective input shaft 121, 122 in such a way as to drive in rotation the input shaft. The output shaft 123 is connected to the second drive shaft 13.

The first drive shaft 6 is formed of a single part comprising a first shaft portion 61 and a second shaft portion 62. The second drive shaft 13 comprises a third shaft portion 63.

Furthermore, in each device 4, the nut 53 is secured to the first drive shaft 53.

In operation, the input shafts 121 and 122 are driven in rotation by drive members 5. The rotation of the input shafts 121 and 122 causes a rotation of the output shaft 123 at a speed equal to the sum of the speeds of the input shafts 121 and 122.

The output shaft 123 drives in rotation the second drive shaft 13.

The rotation of the second drive shaft 13 around the axis X' drives a translation of the first drive shaft 6 according to the direction of the axis X'.

Indeed, on the one hand, the drive shaft 6 is blocked in rotation by the third straight grooves 630. The third straight grooves 630 authorize only a displacement of the drive shaft 6 in translation according to the direction of the axis X, in relation to the wing.

On the other hand, the second grooves 620 that cooperate with the grooves of the nut 53 make it possible to convert a displacement in rotation of the second drive shaft 13 into a displacement in translation of the nut 53 secured to the first drive shaft 6.

The translation of the first shaft 6 generates a rotation of the connecting rod 7 around the axis of rotation X'.

The third arrangement shown in FIG. 7 has the advantage of being rather insensitive to motor breakdowns. Indeed, in the event of a breakdown of one of the drive members 5, the two devices for actuating 4 continue to operate at a reduced speed thanks to the presence of the differential 12. Each motor is provided with a parking brake which immobilizes the motor in the event of a breakdown.

When the two drive members 5 are in operating state, the speed transmitted to the second shaft is double, in such a way that the available output power is double.

FIGS. 8 and 9 diagrammatically show a device for driving in accordance with a second embodiment of the invention.

The device 4 comprises in general a frame 9, a reducing mechanism 15, an input part 16, two sliders 6, a control rod 17 and a connecting rod 7.

The reducing mechanism 15 is adapted in order to be connected on the one hand to a drive member (not shown) and on the other hand to the input part 16, in such a way as to transmit a rotating movement from the actuating member to the input part 16.

In the embodiment shown, the input part 16 is a shaft of generally cylindrical form comprising an external surface whereon are formed helical grooves 160 receiving balls 172. The input part 16 is mounted rotating in relation to the frame 9 around an axis X by the intermediary of bearings 18. More precisely, the input part 16 comprises two zones arranged on either side of a plane of symmetry Y perpendicular to the axis of rotation X: a first zone 161 wherein the grooves are oriented in a first direction and a second zone 162 wherein the grooves are oriented in a second direction, the grooves of the first zone 161 being symmetrical to the grooves of the second zone 162 in relation to the plane Y.

The sliders 6 are also symmetrical in relation to the plane Y. Each slider 6 is a nut comprising a body having a generally cylindrical form and extending around the input part 16. The body comprises an external surface 61 provided with first helical grooves 610 (external grooves) and an internal surface 62 provided with second helical grooves 620 (internal grooves).

The connecting rod 7 comprises a hollow cylindrical portion 70 extending around sliders 6. The hollow cylindrical portion 70 comprises an internal surface 71 of generally cylindrical form, the internal surface 71 being provided with internal helical grooves 710 receiving balls. The internal surface 710 comprises two zones arranged on either side of a plane of symmetry Y perpendicular to the axis of rotation X: a first zone 711 wherein the grooves are oriented in a first direction and a second zone 712 wherein the grooves are oriented in a second direction, the grooves of the first zone 171 being symmetrical to the grooves of the second zone 172 in relation to the plane Y.

The control rod 17 is mounted fixed in relation to the frame 9. The control rod 17 is straight and extends in parallel to the axis of rotation X of the input part and at a distance from the latter. The control rod 17 extends through the sliders 6 in such a way as to block in rotation the sliders 6 in relation to the frame 9 while still authorizing a translation of the sliders 6 in relation to the frame parallel to the direction X.

The grooves 160 of the input part 16 cooperate with the internal grooves 620 of each slider 6 in order to former a path for rolling for the balls 172.

The external grooves 610 of each of the sliders 6 cooperate with the internal grooves 710 of the connecting rod in order to form a path for rolling for the balls 173.

In operation, the input part 16 is driven in rotation by the drive member by the intermediary of the reducer 15. The rotation of the input part 16 drives a translation of each slider 6 along the input part 16, parallel to the direction X.

Indeed, on the one hand, the sliders 6 are blocked in rotation by the control rod 17. The control rod 17 authorizes only a displacement of the sliders 6 in translation according to the direction X, in relation to the wing.

On the other hand, the internal grooves 620 which cooperate with the grooves 160 of the input part 16 by the intermediary of balls 172 make it possible to convert a displacement in rotation of the input part 16 into a displacement in translation of the sliders 6.

The helical grooves 160, 620 are arranged in such a way that the sliders 6 are displaced in opposite directions in relation to one another.

The translation of the sliders 6 generates a rotation of the connecting rod 7 around the axis of rotation X.

The helical grooves 610, 710 are arranged in such a way that the displacements of the sliders 6 in opposite directions in relation to one another, causes a rotation of the connecting rod 7 in the same direction of rotation.

The second embodiment shown in FIGS. 8 and 9 has the advantage that the axial efforts exerted by the sliders 6 on the input shaft 16 are compensated between themselves. This prevents the structure of the plane (wing) from having to support the axial efforts.

FIGS. 10 to 12 diagrammatically show a slider 6 able to be used in the device in FIGS. 8 and 9.

The slider 6 shown is formed of three portions: it comprises a hollow cylindrical body 611 and two end pieces 612, 613 adapted in order to be fixed on each face of the body 611.

The body 611 comprises an external cylindrical surface 610 whereon are formed helical grooves 610 for circulating balls 173. The body 611 further comprises internal channels 614 for recirculating balls 173 formed inside the body 611 parallel to an axial direction of the body 611. Each internal channel 614 for recirculation makes it possible to carry balls 173 removed at the output of a circulation groove 610 in order to reintroduce them at the input of a circulation groove.

Each end piece 612, 613 comprises portions of channels 615, each portion of channel 615 forming an elbow making it possible to connect each helical groove 610 for ball circulation to an associated internal channel 614 for recirculation.

In operation, the portions of channels 615 of one of the end pieces 612, 613 remove balls at the output of the circulation grooves and introduce the balls removed at the input of the channels for recirculation. The portions of channels 615 of the other end pieces 612, 613 remove balls at the output of the channels for recirculation and introduce the balls removed at the input of the circulation grooves.

Note that the end pieces make it possible to guide the balls from the periphery of the body 611 towards the interior of the body, which corresponds to a displacement of the balls against the centrifugal force which is exerted on the balls. In order to overcome the centrifugal force, each portion of channel 615 has an enlarged input end 6150 making it possible to cause a ball to fall into the portion of canal 615, the ball being then pushed into the portion of canal 615 by the arrival of a following ball.

FIG. 13 diagrammatically shows another slider 6 able to be used in the device in FIGS. 8 and 9, In this figure, the slider 6 comprises a cylindrical body 611 comprising on its external cylindrical surface 61, on the one hand helical grooves 610 for circulating balls and on the other hand helical grooves 616 for recirculating balls. The helical grooves 616 for recirculating balls are interposed between the circulation grooves 610. The helical grooves 616 for recirculating balls have a depth that is greater than the depth of the helical grooves of circulation 610.

The internal surface 71 of the connecting rod 7 is provided with internal helical grooves 710 arranged in order to face the helical grooves 610 for circulating balls of the slider 6, in such a way as to create a path for rolling making it possible for the balls 173 to transmit efforts between the slider 6 and the connecting rod 7.

On the other hand, the internal surface 71 of the connecting rod is devoid of grooves facing the helical grooves 616 for recirculation. The balls 173 are maintained in the helical grooves 616 for recirculation by the smooth internal surface 71 of the connecting rod 7. In this way, the balls 173 which are located in these grooves for recirculation 616 do not transmit any effort between the slider 6 and the connecting rod 7.

FIG. 14 diagrammatically shows another slider able to be used in the device in FIGS. 8 and 9.

In this figure, the slider 6 comprises a cylindrical body 611 comprising on its external cylindrical surface 61, on the one hand helical grooves 610 for circulating balls 173 and on the other hand helical grooves 617 for recirculating balls. The helical grooves 617 for recirculating balls are interposed between the circulation grooves 610.

The slider 6 comprises covers 618 for closing the helical grooves 617 for recirculating balls, each cover having the form of a ribbon and covering a helical groove 617. Each cover 618 makes it possible to close an associated recirculation groove 617, in such a way that the groove 617 and the cover 618 together form a channel for recirculating balls.

The sliders 6 of FIGS. 13 and 14 show the advantage that the body 611 can have a thickness e that is lower than the body 611 of the slider in FIG. 12 which must accommodate internal channels 614 for recirculation.

The invention claimed is:

1. A device (4) for actuating a control surface (2) of an aircraft, comprising:
    a frame for fixedly mounting to a structure of an aircraft,
    a connecting rod (7) rotatable in relation to the frame around an axis of rotation (X, X') for displacement of the control surface (2), said connecting rod including helical grooves (710) for the circulation of balls (173), said helical grooves being arranged in a first zone (711) and a second zone (712), wherein said helical grooves are oriented in a first direction in said first zone and in a second direction in said second zone,
    a control rod mounted fixed in relation to the frame, the control rod extending through the slider (6), wherein the control rod extends parallel to the axis of rotation of an input part and at a distance from the input part, in order to block rotation of the slider in relation to the frame and allow a translational movement of the slider in relation to the frame,
    a slider (6) for connecting to a drive member (5), the slider (6) being mobile in relation to the frame according to a direction of translational movement, parallel to the axis of rotation (X, X') of the connecting rod (7),
    the slider (6) comprising first helical grooves (610) cooperating with the helical grooves (710) of the connecting rod (7) in order to convert a displacement in translational movement of the slider (6) generated by the drive member (5) into a displacement in rotation of the connecting rod (7), in order to actuate a mechanical unit (1) for displacement of the control surface (2), wherein the slider (6) comprises a cylindrical body (611) having the first helical grooves (610) for the circulation of the balls (173) formed on an external cylindrical surface of the body (611) and internal channels (614) for the recirculation of the balls formed inside the body (611) configured to carry the balls removed at an output of the first helical grooves (610) in order to reintroduce them at an input of the first helical grooves (610).

2. The device according to claim 1, comprising a drive member (5) in the form of a rotating motor and a connecting portion (62) in order to convert a rotating movement of the motor into a displacement in translational movement of the slider (6).

3. The device according to claim 2, comprising an input part (53, 16) which is driven in rotation by the motor, and wherein the connecting portion includes second helical grooves (620) on the slider (6) and cooperating with additional helical grooves of the input part (53), the rotation of the input part (53) causing a translational movement of the slider (6).

4. The device according to claim 3, wherein the slider (6) comprises a portion (63) having straight grooves (630) in order to block rotation of the slider in relation to the frame and allow a translational movement of the slider in relation to the frame.

5. The device according to claim 3, wherein the first helical grooves (610) have a resulting pitch that is greater than a resulting pitch of the second helical grooves (620).

6. The device according to claim 3, comprising:
a second slider (6), the slider and second slider being mounted to enable translational movement of the sliders in relation to the frame (9) according to a direction of translational movement,
the connecting portion (160, 62) is disposed between the input part (16) and each slider (6) in order to convert a displacement in rotational movement of the input part (16) into a displacement in translational movement of each slider (6),
a second connecting portion (61, 71) disposed between each slider (6) and the connecting rod (7) in order to convert the displacements in translational movement of the sliders (6) into a displacement in rotational movement of the connecting rod (7), so as to actuate the mechanical unit for displacing the control surface,
wherein the first and second connecting portions are arranged in such a way that axial forces exerted by the sliders (6) on the input part (16) substantially cancel each other.

7. The device according to claim 6, wherein the translational movement of each slider (6) is parallel to the axis of rotation of the connecting rod (X, X').

8. The device according to claim 6, wherein the second connecting portion (61, 71) is arranged in such a way that the sliders (6) are displaced in translational movement in opposite directions.

9. The device according to claim 3, comprising:
a second drive member (5), and
a differential unit (12) configured to convert the displacements in rotation of the drive member and second drive member (5) into a displacement in rotation of the input part (53) intermediary to a rotating speed proportional to a sum of rotating speeds of the drive members.

10. The device according to claim 1, comprising a drive rod (10) including a first end (101) mounted rotating in relation to the connecting rod (7) and a second end (102) mounted rotating in relation to an input part (11) of the mechanical unit (1) the input part (11) being mounted rotating around a fixed axis (X) in relation to a wing of the plane.

11. The device according to claim 1, wherein the slider (6) further comprises a first end piece (612) comprising portions of channels (615) arranged in order to remove balls at the output of the first helical grooves (610) and introduce the balls removed at the input of channels for recirculating (615), and a second end piece (613) comprising portions of channels (615) arranged in order to remove balls at the output of the channels for recirculating (615) and introducing the balls removed at the input of the first helical grooves (610).

12. A device (4) for actuating a control surface (2) of an aircraft, comprising:
a frame for fixedly mounting in relation to a structure of an aircraft,
a connecting rod (7) rotatable in relation to the frame around an axis of rotation (X, X') for displacement of the control surface (2), said connecting rod including helical grooves (710) for the circulation of balls (173), said helical grooves being arranged in a first zone (711) and a second zone (712), wherein said helical grooves are oriented in a first direction in said first zone and in a second direction in said second zone,
a slider (6) for connecting to a drive member (5), the slider (6) being mobile in relation to the frame according to a direction of translational movement, parallel to the axis of rotation (X, X') of the connecting rod (7),
a control rod mounted fixed in relation to the frame, the control rod extending through the slider (6), wherein the control rod extends parallel to the axis of rotation of an input part and at a distance from the input part, in order to block rotation of the slider in relation to the frame and allow a translational movement of the slider in relation to the frame,
the slider (6) comprising helical grooves (610) cooperating with the helical grooves (710) of the connecting rod (7) in order to convert a displacement in translational movement of the slider (6) generated by the drive member (5) into a displacement in rotation of the connecting rod (7), in order to actuate the mechanical unit (1) for displacement of the control surface (2),
wherein the slider (6) comprises a cylindrical body (611) having the helical grooves (610) for circulating the balls (173) formed on an external cylindrical surface (61) of the body, and second helical grooves (616, 617) for recirculating the balls formed on the external cylindrical surface (61) of the body and arranged between the helical grooves (610).

13. The device according to claim 12, wherein the slider (6) comprises a cover (618) covering the second helical grooves (617) for recirculating the balls in order to form channels for recirculating the balls.

14. The device according to claim 13, comprising a drive member (5) in the form of a rotating motor and a connecting portion (62) in order to convert a rotating movement of the motor into a displacement in translational movement of the slider (6).

* * * * *